United States Patent
Ito et al.

(10) Patent No.: US 12,308,984 B2
(45) Date of Patent: May 20, 2025

(54) COMMUNICATION SYSTEM WHICH DETERMINES A COMMUNICATION FEE OR A MONETARY AMOUNT OF REWARD

(71) Applicant: HONDA MOTOR CO., LTD., Tokyo (JP)

(72) Inventors: Motoki Ito, Tokyo (JP); Ryusuke Tamanaha, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 278 days.

(21) Appl. No.: 17/977,217

(22) Filed: Oct. 31, 2022

(65) Prior Publication Data

US 2023/0171117 A1 Jun. 1, 2023

(30) Foreign Application Priority Data

Nov. 30, 2021 (JP) .................. 2021-194710

(51) Int. Cl.
*H04L 12/14* (2024.01)

(52) U.S. Cl.
CPC ...... *H04L 12/1428* (2013.01); *H04L 12/1403* (2013.01)

(58) Field of Classification Search
CPC ........ G06Q 50/26; G06Q 50/50; G07C 5/008; G07C 5/0866; H04L 12/14–1435; H04M 15/28–30; H04M 15/8044; H04M 15/8083; H04M 15/00–93; H04W 4/24
See application file for complete search history.

(56) References Cited

U.S. PATENT DOCUMENTS

| | | | |
|---|---|---|---|
| 2004/0093374 A1 | 5/2004 | Miyazaki | |
| 2005/0026592 A1* | 2/2005 | Walter | H04L 12/1432 455/406 |
| 2013/0102269 A1* | 4/2013 | Ray | H04W 52/0296 455/404.1 |

FOREIGN PATENT DOCUMENTS

| | | |
|---|---|---|
| JP | 2004-157938 A | 6/2004 |
| JP | 2015-179920 A | 10/2015 |
| JP | 2018-55352 A | 4/2018 |
| JP | 2019-33443 A | 2/2019 |

(Continued)

OTHER PUBLICATIONS

Collins Dictionary meaning of "system", printed on Sep. 16, 2024. Retrieved from Internet: <https://www.collinsdictionary.com/dictionary/english/system>. (Year: 2024).*

(Continued)

*Primary Examiner* — Ronald Eisner
(74) *Attorney, Agent, or Firm* — Rankin, Hill & Clark LLP (57) ABSTRACT

A communication system includes: an information transmission section that performs information transmission via a communication network; a communication relaying section that relays a communication between a mobile communication terminal and the communication network; and a fee determination section that determines a communication fee for communication via a communication network or a monetary amount of reward for the information transmission, based on a first communication volume related to the information transmission, or on a ratio of the first communication volume to a second communication volume related to the communication relaying.

8 Claims, 7 Drawing Sheets

(56) References Cited

FOREIGN PATENT DOCUMENTS

| | | |
|---|---|---|
| JP | 2020-177677 | 10/2020 |
| JP | 2021-2147 A | 1/2021 |

OTHER PUBLICATIONS

Collins Dictionary: A system is a set of devices powered by electricity, for example a computer or an alarm. Collins Dictionary meaning of "system", printed on Sep. 16, 2024. Retrieved from Internet: <https://www.collinsdictionary.com/dictionary/english/system> (Year: 2024).*

Japanese Office Action Corresponding to JP Application No. 2021-194710, issued Sep. 17, 2024, with English translation, 9 pages.

* cited by examiner

COMMUNICATION SYSTEM WHICH DETERMINES A COMMUNICATION FEE OR A MONETARY AMOUNT OF REWARD

INCORPORATION BY REFERENCE

The present application claims priority under 35 U.S.C. § 119 to Japanese Patent Application No. 2021-194710 filed on Nov. 30, 2021. The content of the application is incorporated herein by reference in its entirety.

BACKGROUND OF THE INVENTION

Field of the Invention

The present invention relates to a communication system.

Description of the Related Art

Conventionally, a system has been proposed in which a driving recorder mounted on a mobile object is configured to include a function of communicating with an image collection apparatus provided outside of the mobile object, and to transmit an image captured by the driving recorder to the image collection apparatus (for example, see Japanese Patent Laid-Open No. 2020-177677). In the system, captured images are used for detection of an accident and for other purposes, such as fixed-point observation, search for a stray child, and check on a situation at a fire site.

In a system that checks a situation of an accident, a disaster, or the like as described above, it is preferable to collect more images captured at various points from more driving recorders and the like equipped with an image pick-up device. To this end, it is preferable to restrain communication costs incurred when captured images are transmitted from the driving recorders and the like and thereby to prevent the communication costs from constituting an obstacle to the transmission of captured images so that more people can participate in providing images more easily.

The present invention has been made in view of such a background, and an object of the present invention is to realize a communication system that can promote provision of information such as a captured image.

The object can also lead to a reduction in the number of victims in a disaster or an accident, through contribution to the swift provision of information related to the disaster or the accident, and can contribute to the realization of a sustainable society (SDGs 11.5).

SUMMARY OF THE INVENTION

One aspect of the present invention is a communication system including: an information transmission section that performs information transmission to an information collection apparatus via a communication network; a communication relaying section that performs communication relaying for connecting a mobile communication terminal to the communication network by relaying a communication to or from the mobile communication terminal; and a fee determination section that determines a communication fee for communication via the communication network, or a monetary amount of reward for the information transmission, wherein the fee determination section determines the communication fee or the monetary amount of reward, based on a first communication volume related to the information transmission, or based on a ratio of the first communication volume to a second communication volume related to the communication relaying.

According to another aspect of the present invention, the information transmission is transmission of image data captured by an image pick-up device, and the fee determination section determines the communication fee or the monetary amount of reward, based on the first communication volume as a communication volume related to the transmission of the image data, or based on the ratio of the first communication volume as the communication volume related to the transmission of the image data, to the second communication volume related to the communication relaying.

According to another aspect of the present invention, the larger the first communication volume related to the information transmission is, or the larger the ratio of the first communication volume to the second communication volume related to the communication relaying is, the smaller communication fee or the larger monetary amount of reward the fee determination section determines.

According to another aspect of the present invention, the communication system further includes a first communication section that performs the communication via the communication network, through communication using a first communication scheme involving a charge, or through communication using a second communication scheme involving no charge, wherein the fee determination section determines the communication fee with respect to the communication using the first communication scheme, and determines the monetary amount of reward with respect to the first communication volume related to the information transmission using the second communication scheme.

According to another aspect of the present invention, the communication system includes a camera including an image pick-up device, or a driving recorder including an image pick-up device.

According to another aspect of the present invention, the communication system is provided to a mobile object, and as the communication relaying, the communication relaying section connects the mobile communication terminal existing in the mobile object to the communication network by relaying a communication to or from the mobile communication terminal existing in the mobile object.

According to any aspect of the present invention, it is possible to realize a communication system that can promote provision of information such as a captured image.

DETAILED DESCRIPTION OF THE PREFERRED EMBODIMENTS

Hereinafter, embodiments of the present invention are described with reference to the drawings.

1. Scenario in which Communication System is Used

Figure 1:
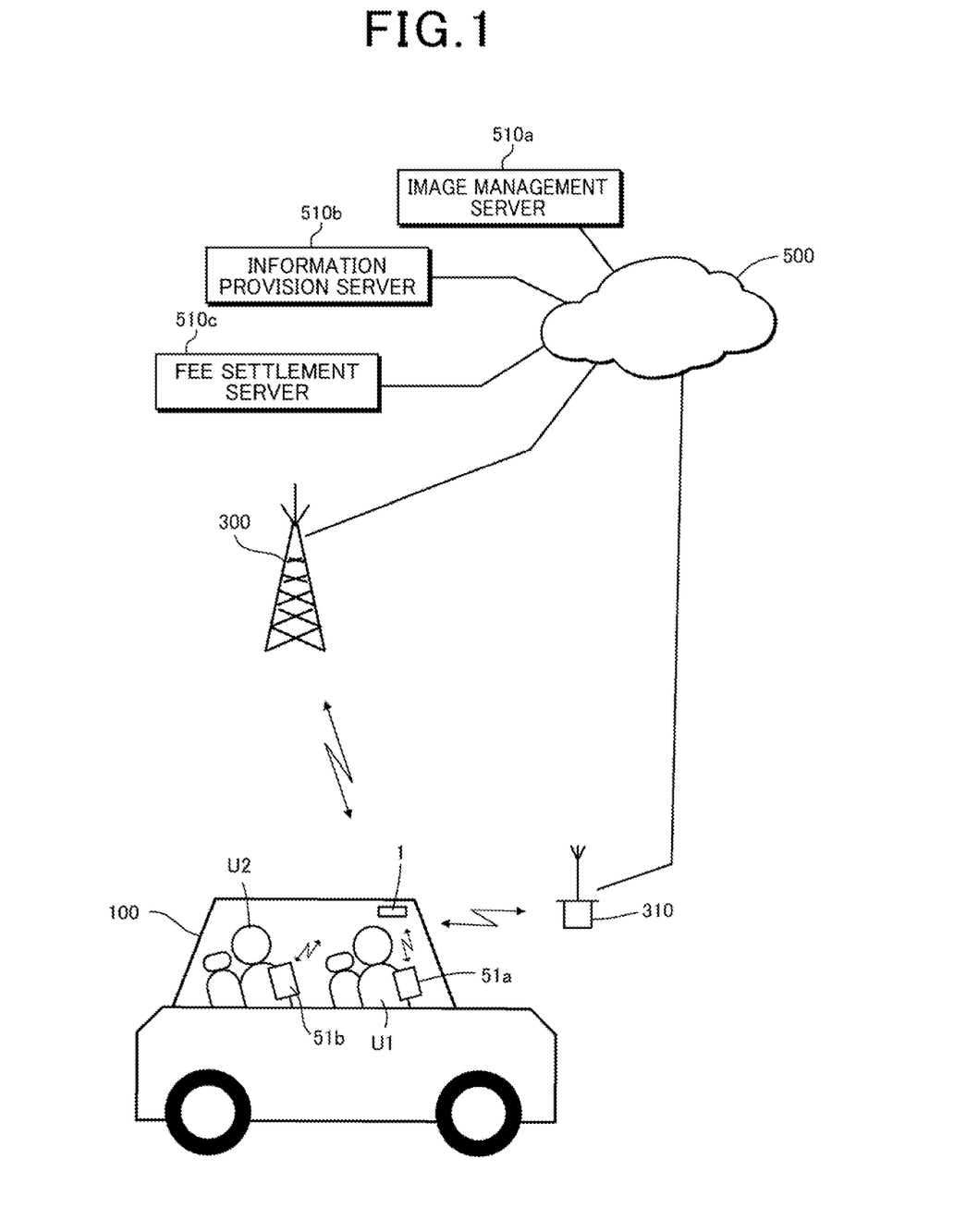
FIG. 1 is a diagram for describing a scenario in which a communication system according to an embodiment of the present invention is used.

FIG. 1 is a diagram showing an example of a scenario in which a communication system 1 according to an embodiment is used. The communication system 1 has a function of collecting predetermined information by using a sensor or the like, and transmitting the collected information to an information collection apparatus. In the present embodiment, the information is image information, and the communication system 1 is implemented, for example, as a driving recorder. The communication system 1 is used in a form of being mounted on a vehicle 100, captures images of surroundings of the vehicle 100 and an inside of a vehicle cabin of the vehicle 100, and transmits the captured images to an image management server 510a provided outside of the vehicle 100. The image management server 510a corresponds to the information collection apparatus in the present disclosure. The image management server 510a can perform, for example, processing for analysis of an accident, fixed-point observation, inspection of a road facility, or the like, by using the captured image received from the communication system 1.

The communication system 1 has a function of performing cellular communication and Wi-Fi® communication. The communication system 1 performs communication with an external communication apparatus via a communication network 500 by performing cellular communication with a base station 300 in each cell, or by performing Wi-Fi communication with a router 310 installed at a Wi-Fi spot near a road. In the present embodiment, the router 310 is, for example, a router installed at a free Wi-Fi spot.

External communication apparatuses include the image management server 510a, which is the above-mentioned information collection apparatus. In the example in FIG. 1, an information provision server 510b and a fee settlement server 510c are further illustrated as external communication apparatuses. The information provision server 510b can be accessed by a mobile communication terminal such as a smartphone via the communication network 500. The fee settlement server 510c receives information on a communication fee and a monetary amount of reward, which will be described later, from the communication system 1, and, for example, in accordance with a conventional technique, collects the received communication fee from and pays the received monetary amount of reward into a bank account of an owner of the communication system 1. Hereinafter, the image management server 510a, the information provision server 510b, and the fee settlement server 510c are also collectively referred to as the external communication apparatus 510.

The communication system 1 performs communication directly with mobile communication terminals 51a, 51b used respectively by users U1, U2 who are aboard the vehicle 100, through in-vehicle Wi-Fi communication. The communication system 1 has a function as a Wi-Fi router that relays communications between the mobile communication terminals 51a, 51b connected with the communication system 1 through in-vehicle Wi-Fi communication, and the communication network 500.

The mobile communication terminals 51a, 51b are any of a smartphone, a mobile telephone, a tablet terminal, a portable game console, and the like. Hereinafter, the users U1 and U2 are also collectively referred to as the user U, and the mobile communication terminals 51a, 51b are also collectively referred to as the mobile communication terminal 51.

Even if the mobile communication terminal 51 does not have cellular communication functionality, the user U can perform communication with the information provision server 510b by being connected to the communication network 500 via the communication system 1. Note that, for example, when the vehicle 100 is parked or stopped, the communication system 1 may relay a communication to or from a mobile communication terminal outside of the vehicle 100, depending on a radio wave range of the communication system 1.

2. Configuration of Communication System

A configuration of the communication system 1 is described with reference FIG. 2. The communication system 1 includes a processor 10, a memory 20, a NAD (Network Access Device) 30, an antenna 31, an image pick-up device 32, a GNSS (Global Navigation Satellite System) sensor 34, and an accelerometer 35.

The NAD 30 is a chip on which a cellular communication module and a Wi-Fi communication module are integrated. The antenna 31 is a dual-purpose antenna that supports cellular communication and Wi-Fi communication.

The image pick-up device 32 is, for example, a CCD (Charge Coupled Device), captures an image of the surroundings of the vehicle 100 and/or an image of the inside of the vehicle cabin of the vehicle 100, and outputs the captured image or images to the processor 10. Note that the communication system 1 can be configured to include a plurality of image pick-up devices 32, depending on the size of an image capture range for the surroundings of the vehicle 100 or for the inside of the vehicle cabin.

The GNSS sensor 34 detects a current position (latitude, longitude) of the communication system 1 by receiving radio waves from positioning satellites, and outputs a position detection signal to the processor 10. The accelerometer 35 is, for example, a three-axis accelerometer, detects respective accelerations in three orthogonal directions occurring in the communication system 1, and outputs sensing outputs indicating respective magnitudes of the accelerations to the processor 10.

The memory 20 includes, for example, a volatile and/or non-volatile semiconductor memory. The processor 10 is a computer included in the communication system 1, which is a communication system, and includes, for example, one or more CPUs (Central Processing Units) or one or more MPUs (Micro Processing Units).

The processor 10 includes, as functional elements or functional units, a first communication section 11, a second communication section 12, an information transmission section 13, a communication relaying section 14, and a fee determination section 15. The functional elements included in the processor 10 are implemented, for example, by the processor 10, which is a computer, executing a communication control program 21, which is a computer program stored in the memory 20. Instead, all, or one or some, of the functional elements included in the processor 10 can also be configured by using hardware including one or more electronic circuit parts for each functional element.

For image transmission of a captured image, which is performed by the information transmission section 13, and for communication relaying of a communication to or from the mobile communication terminal 51, which is performed by the communication relaying section 14, the first communication section 11 performs communication via the communication network 500, through communication using a first communication scheme involving a charge, or through communication using a second communication scheme involving no charge.

In the present embodiment, the first communication scheme involving a charge is, for example, cellular communication that is allowed to be used on a condition of fee payment based on an agreement signed in advance with a communications company or the like, whereas the second communication scheme involving no charge is, for example, Wi-Fi communication via a router 310 installed at a free Wi-Fi spot.

The first communication section 11 performs the communication via the communication network 500 with the external communication apparatus 510, for example, through packet communication. Specifically, the first communication section 11 generates packets in which first communication data inputted from the information transmission section 13 and the communication relaying section 14 and second communication data from the mobile communication terminal 51 are put together. The first communication data includes an image captured by the image pick-up device 32. The first communication section 11 transmits the generated packets to the external communication apparatus 510 via the communication network 500.

Thus, compared to a case where the first communication data and the second communication data are individually packetized and transmitted, the number of packets transmitted cab be reduced, and the total amount of packet control overheads added to the first communication data and the second communication data can be reduced, so that a communication volume in the communication network 500 can be reduced. As a result, the communication system 1 can reduce the amount of use of communications (that is, a communication volume) using the communication network 500, and consequently can reduce communication costs.

When a communication via the communication network 500 is performed, the first communication section 11 transmits information on a first communication volume related to the information transmission (image transmission in the present embodiment) performed by the information transmission section 13 in the communication, and information on a second communication volume related to the communication relaying performed by the communication relaying section 14 in the communication, to the fee determination section 15. Note that with respect to a communication volume corresponding to the overheads, the first communication section 11 can be configured to divide the communication volume evenly, or proportionally to a ratio between the first communication volume and the second communication volume, and to add respective shares to the first communication volume and the second communication volume.

Moreover, when a communication via the communication network 500 is performed, the first communication section 11 identifies whether the communication is performed by using the first communication scheme involving a charge, or is performed by using the second communication scheme involving no charge. A result of the identification, that is, information about a communication scheme used for the communication is added to the information on the first communication volume and the information on the second communication volume to be transmitted to the fee determination section 15.

The second communication section 12 performs communication directly with the mobile communication terminal 51 through in-vehicle Wi-Fi communication by using the NAD 30 and the antenna 31.

The information transmission section 13 performs information transmission to the information collection apparatus via the communication network 500. In the present embodiment, the information collection apparatus is the image management server 510a, and the information transmission is image transmission of a captured image acquired from the image pick-up device 32.

The information transmission section 13, by using the image pick-up device 32, captures an image, for example, at a predetermined image capture timing, and, by using the first communication section 11, transmits the captured image, along with information on a date and time when the image is captured and a position where the image is captured, to the image management server 510a via the communication network 500. Here, the information transmission section 13 can be configured to acquire the information on the position where the image is captured by using the GNSS sensor 34.

For the image capture timing, for example, following timings (1) to (3) can be set.

(1) When the vehicle 100 has an accident.

The information transmission section 13 identifies that the vehicle 100 has an accident, based on a fact that the accelerometer 35 detects an acceleration equal to or higher than a level of a predetermined threshold value. Note that it may be configured to be detected that the vehicle 100 has an accident, based on an impact detection signal issued by an impact sensor included in an airbag or the like mounted on the vehicle 100.

(2) When the vehicle 100 travels through a fixed point.

The information transmission section 13 identifies that the vehicle 100 travels through a preset fixed point, from a current position of the communication system 1 detected by the GNSS sensor 34. For fixed points, for example, a point where traffic congestion easily occurs, a point where a road facility (road sign, utility pole, or the like) to be maintained is placed, a tourist spot, and the like are set.

(3) When the vehicle 100 travels through an image capture request point.

The information transmission section 13 identifies an image capture request point where it is requested to capture an image, by receiving information on the image capture request point transmitted from the image management server 510a, and identifies that the vehicle 100 travels through the image capture request point, from a current position of the communication system 1 detected by the GNSS sensor 34. For image capture request points, for example, a site where an accident caused by another vehicle occurs, a site where a fire occurs, a site where a child is lost, and the like are set.

The communication relaying section 14 performs communication relaying for connecting the mobile communication terminal 51 to the communication network 500 by relaying a communication to or from the mobile communication terminal 51. Thus, the communication relaying section 14 implements the function as a Wi-Fi router, of the communication system 1. Specifically, in accordance with a conventional technique, the communication relaying section 14 intermediates to transfer a communication signal or communication data between the second communication section 12 and the first communication section 11, and relays a communication between the mobile communication terminal 51 connected with the second communication section 12 through in-vehicle Wi-Fi communication, and the communication network 500 via the first communication section 11.

The fee determination section 15 determines a communication fee for a communication via the communication network 500, or a monetary amount of reward for information transmission. In the present embodiment in particular, the fee determination section 15 determines the communication fee or the monetary amount of reward, based on a first communication volume related to the information transmission, or a ratio of the first communication volume to a second communication volume related to the communication relaying. As described above, the information transmission is, for example, image transmission performed by the information transmission section 13.

Specifically, the fee determination section 15 receives information on the first communication volume and the second communication volume from the first communication section 11, and calculates the first communication volume and the second communication volume in each predetermined period by individually accumulating the first communication volume and the second communication volume for the predetermined period (for example, one month).

Then, for example, based on the first communication volume and the second communication volume in each predetermined period (for example, each month), the larger the first communication volume is, or the larger the ratio of the first communication volume to the second communication volume is, the smaller communication fee or the larger monetary amount of reward the fee determination section 15 determines. More specifically, the fee determination section 15 determines the communication fee for communications using the first communication scheme, and determines the monetary amount of reward for the first communication volume related to the image transmission using the second communication scheme.

Moreover, the fee determination section 15 transmits the determined communication fee and monetary amount of reward to the fee settlement server 510c. The fee settlement server 510c that has received the determined communication fee and monetary amount of reward, for example, collects the received communication fee from and pays the received monetary amount of reward into the bank account of the owner of the communication system 1, in accordance with a conventional technique. Here, the fee settlement server 510c can be, for example, a server operated and managed by an operator of the image management server 510a or a financial institution or the like commissioned by the operator.

Note that the fee determination section 15 can be configured to receive in advance information required for the fee determination section 15 to calculate the communication fee and the monetary amount of reward, for example, from the image management server 510a, which is an information collection apparatus, and to store the information in the memory 20. Here, the information required can be, for example, calculation formulas used to calculate the communication fee and the monetary amount of reward, various factors used in the calculation formulas, and the like.

In the communication system 1 having the above-described configuration, the fee determination section 15 determines the communication fee or the monetary amount of reward, based on the first communication volume related to information transmission, or on the ratio of the first communication volume to the second communication volume related to communication relaying. Accordingly, in the communication system 1, opportunities to gain monetary benefits as a result of performing information transmission are expanded, compared to a configuration in which the communication fee is simply determined based on a total sum of the first communication volume and the second communication volume, and the monetary amount of reward is simply determined based on the first communication volume. Consequently, provision of information by using the communication system 1 can be promoted.

Figure 3:
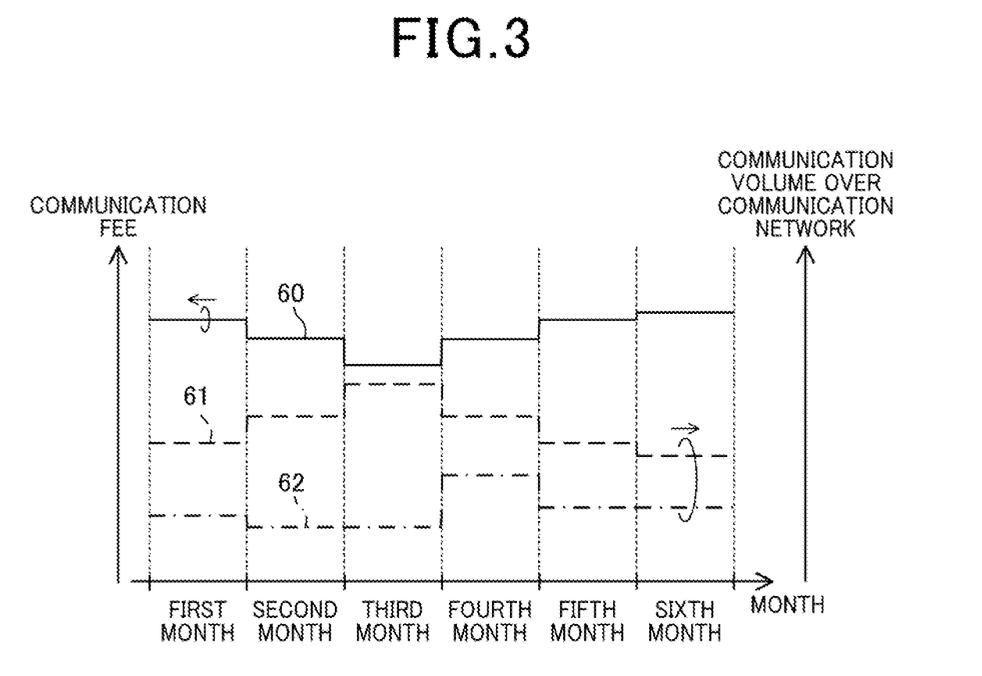
FIG. 3 is an example of monthly changes in communication fee that is determined according to a first communication volume.

FIG. 3 is an example of monthly changes in the communication fee that is determined according to the first communication volume in the communication system 1. In FIG. 3, a left-hand vertical axis represents communication fees for communications via the communication network 500 per month, a right-hand vertical axis represents communication volumes of the communications via the communication network 500, and a horizontal axis represents months. In FIG. 3, a line 60 indicates monthly changes in communication fee, measured based on a scale on the left-hand vertical axis in the figure. Lines 61 and 62 indicate monthly changes in the first communication volume related to the image transmission by the information transmission section 13, and monthly changes in the second communication volume related to the communication relaying by the communication relaying section 14, respectively, both measured based on a scale on the right-hand vertical axis in the figure. Note that in FIG. 3, both the first communication volume and the second communication volume are assumed to result from communications performed by using the first communication scheme involving a charge.

In the example shown in FIG. 3, the communication fee indicated by the line 60 is determined according to the first communication volume indicated by the line 61, regardless of the second communication volume indicated by the line 62, and the larger the first communication volume is in a month, the smaller the communication fee is determined.

Figure 4:
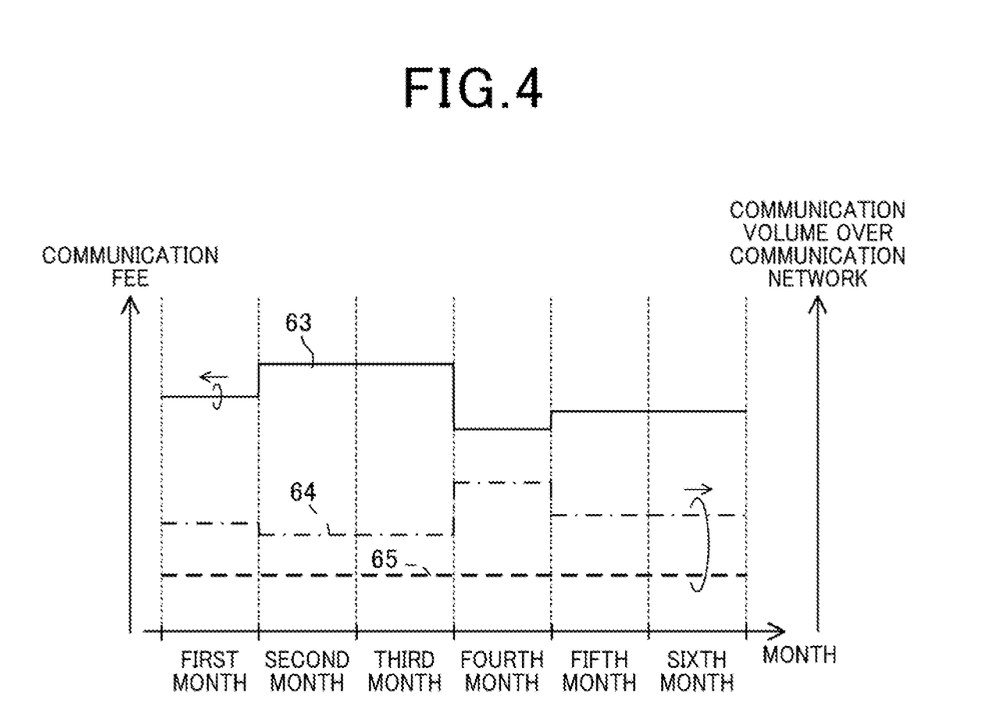
FIG. 4 is an example of monthly changes in communication fee that is determined according to a ratio of the first communication volume to a second communication volume.

FIG. 4 is an example of monthly changes in the communication fee that is determined according to the ratio of the first communication volume to the second communication volume in the communication system 1. Vertical axes and a horizontal axis in FIG. 4 are similar to those in FIG. 3. In FIG. 4, a line 63 indicates monthly changes in communication fee, measured based on a scale on the left-hand vertical axis in the figure. Lines 64 and 65 indicate the monthly first communication volumes and the monthly second communication volumes, respectively. Note that in FIG. 4, both the first communication volume and the second communication volume are assumed to result from communications performed by using the first communication scheme involving a charge. Moreover, in FIG. 4, it is assumed that the second communication volume does not change, in order to make it easier to see changes in the ratio of the first communication volume to the second communication volume.

In the example shown in FIG. 4, the communication fee indicated by the line 63 is determined according to the ratio of the first communication volume indicated by the line 61 to the second communication volume indicated by the line 62, and the larger the ratio is in a month, the smaller the communication fee is determined.

Figure 5:
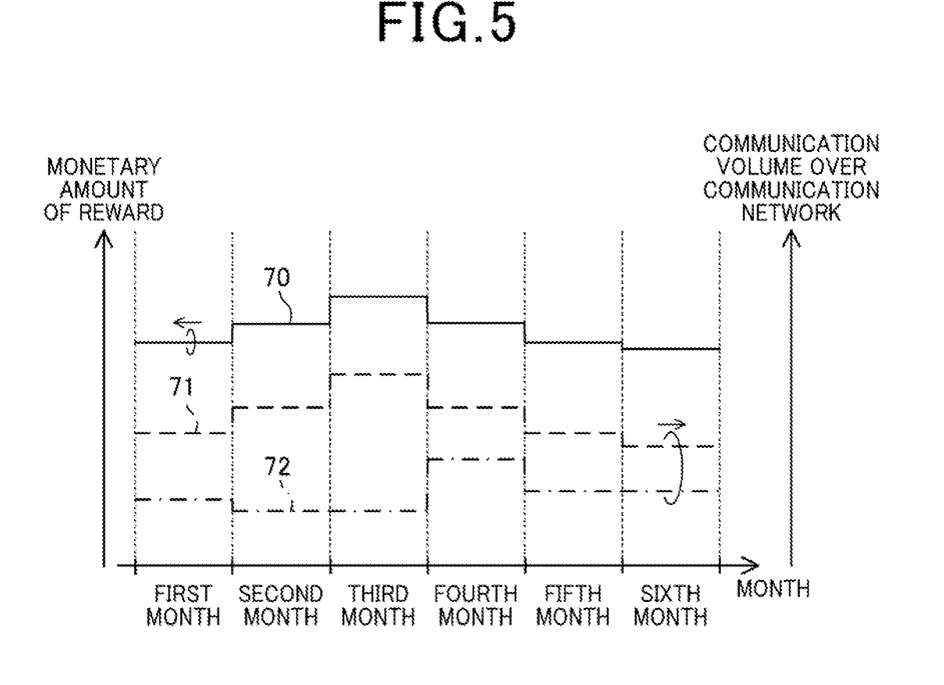
FIG. 5 is an example of monthly changes in monetary amount of reward that is determined according to the first communication volume.

FIG. 5 is an example of monthly changes in the monetary amount of reward that is determined according to the first communication volume in the communication system 1. In FIG. 5, a left-hand vertical axis represents monetary amounts of reward for information transmission (image transmission in the present embodiment) via the communication network 500 per month, a right-hand vertical axis represents communication volumes of communications via the communication network 500, and a horizontal axis represents months. In FIG. 5, a line 70 indicates the monthly monetary amounts of reward, measured based on a scale on the left-hand vertical axis in the figure. Lines 71 and 72 indicate the monthly first communication volumes related to the image transmission by the information transmission section 13, and the monthly second communication volumes related to the communication relaying by the communication relaying section 14, respectively, both measured based on a scale on the right-hand vertical axis in the figure. Note that in FIG. 5, both the first communication volume and the second communication volume are assumed to result from communications performed by using the second communication scheme involving no charge.

In the example shown in FIG. 5, the monetary amount of reward indicated by the line 70 is determined according to the first communication volume indicated by the line 71, regardless of the second communication volume indicated by the line 72, and the larger the first communication volume is in a month, the larger the monetary amount of reward is determined.

Figure 6:
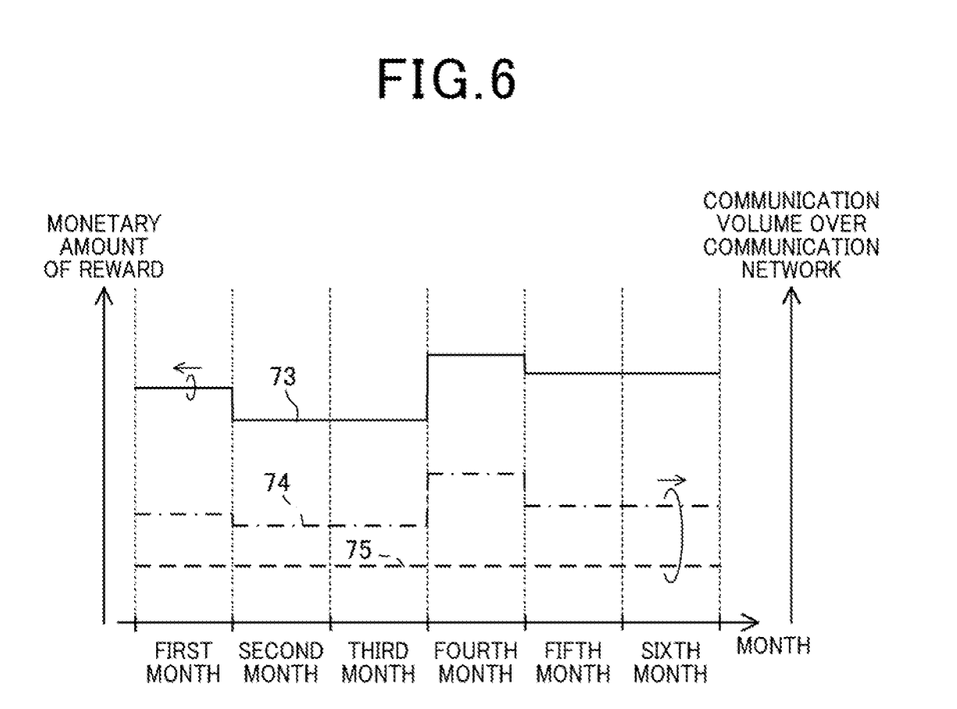
FIG. 6 is an example of monthly changes in monetary amount of reward that is determined according to the ratio of the first communication volume to the second communication volume.

FIG. 6 is an example of monthly changes in the monetary amount of reward that is determined according to the ratio of the first communication volume to the second communication volume in the communication system 1. Vertical axes and a horizontal axis in FIG. 6 are similar to those in FIG. 5. In FIG. 6, a line 73 indicates the monthly monetary amounts of reward. Lines 74 and 75 indicate the monthly first communication volumes and the monthly second communication volumes, respectively. Note that in FIG. 6, both the first communication volume and the second communication volume are assumed to result from communications performed by using the second communication scheme involving no charge. Moreover, in FIG. 6, it is assumed that the second communication volume does not change, in order to make it easier to see changes in the ratio of the first communication volume to the second communication volume.

In the example shown in FIG. 6, the monetary amount of reward indicated by the line 73 is determined according to the ratio of the first communication volume indicated by the line 71 to the second communication volume indicated by the line 72, and the larger the ratio is in a month, the larger the monetary amount of reward is determined.

3. Operation in Communication System

Figure 7:
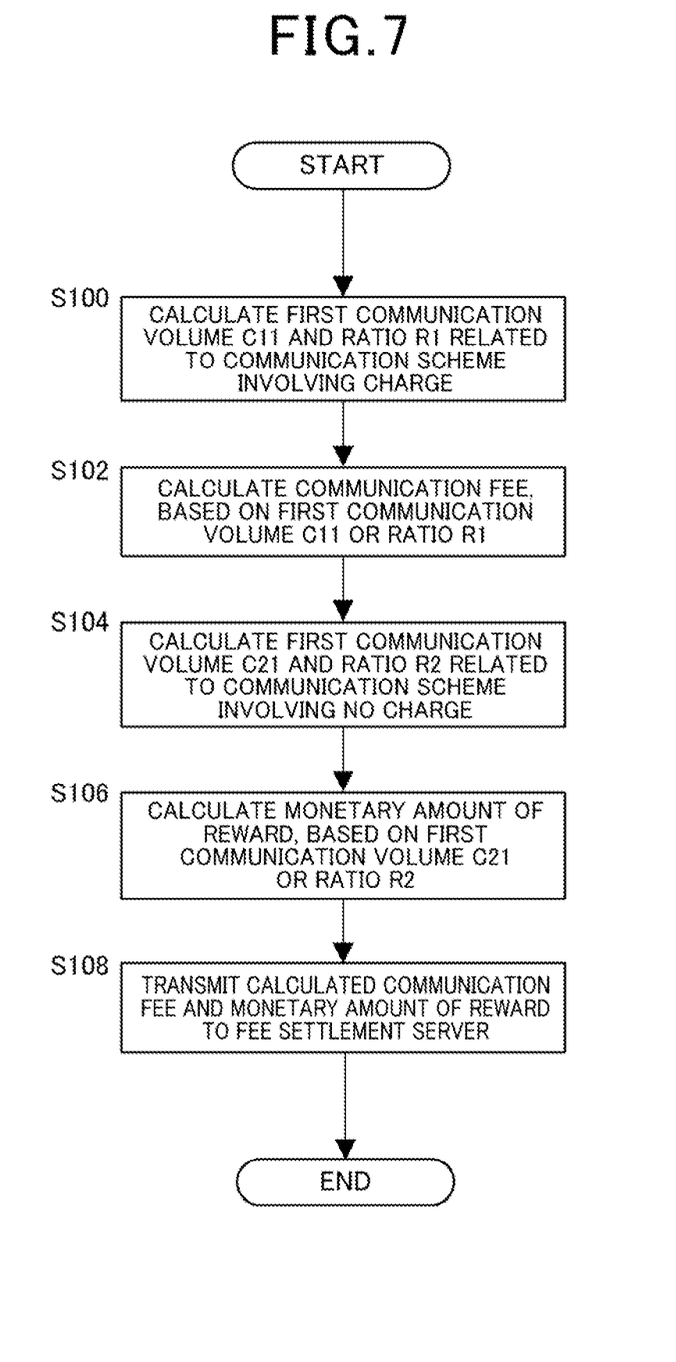
FIG. 7 is a flowchart showing a procedure of fee determination operation in the communication system.

Next, a description is given of fee determination operation of determining the communication fee or the monetary amount of reward, in the communication system 1. FIG. 7 is a flowchart showing a procedure of the fee determination operation in the communication system 1. Processing shown in FIG. 7 is performed at predetermined time intervals, for example, at the end of each month. Although not shown in FIG. 7, it is assumed that in a period from the beginning of a month to the end of the month, the fee determination section 15 receives information on the first communication volume and the second communication volume from the first communication section 11, and individually stores, in the memory 20, the first communication volume and the second communication volume related to the first communication scheme involving a charge and the first communication volume and the second communication volume related to the second communication scheme involving no charge.

In the following description related to FIG. 7, it is assumed that the first communication volume and the second communication volume refer to the first communication volume and the second communication volume accumulated for a period from the beginning to the end of a most recent month.

When the processing is started, the fee determination section 15 calculates a first communication volume C11 related to the first communication scheme involving a charge, and a ratio R1 of the first communication volume C11 to a second communication volume C12 (S100). Next, the fee determination section 15 determines a communication fee for the most recent month, based on the first communication volume C11 or the ratio R1 (S102).

Subsequently, the fee determination section 15 calculates a first communication volume C21 related to the second communication scheme involving no charge, and a ratio R2 of the first communication volume C21 to a second communication volume C22 (S104). Next, the fee determination section 15 determines a monetary amount of reward for the most recent month, based on the first communication volume C21 or the ratio R2 (S106).

Then, the fee determination section 15 transmits the determined communication fee and the determined monetary amount of reward to the fee settlement server 510c (S108), and terminates the processing. The fee settlement server 510c receives the determined communication fee and the determined monetary amount of reward, and, for example, collects the received communication fee from and pays the received monetary amount of reward into the bank account of the owner of the communication system 1, in accordance with a conventional technique.

4. Other Embodiments

In the above-described embodiment, the communication system 1 transmits a captured image to the image management server 510a via the communication network 500. However, the communication system 1 according to the present disclosure can be a communication system that collects arbitrary predetermined information not limited to captured images by using a sensor or the like and transmits the collected arbitrary information to an information collection apparatus via a communication network. Such information can be weather data such as an amount of rainfall, an amount of wind, or a temperature, earthquake data including a seismic intensity, an amount of electricity or water used acquired from an electric meter or a water meter, or the like.

Although the communication system 1 is configured as a driving recorder including the image pick-up device 32 in the above-described embodiment, the communication system 1 may be configured as a camera including a similar image pick-up device. Such a camera can be a surveillance camera installed in a building such as a residence or a commercial building, or on a street lamp, or a camera included in a flight vehicle such as a drone, an air-floating object such as an advertising balloon, or the like.

Although the four-wheeled vehicle 100 is illustrated as a mobile object on which a driving recorder, which is the communication system 1, is mounted in the above-described embodiment, a mobile object may be a two-wheeled vehicle, a flight vehicle, a ship, or the like.

Although access to the communication network 500 is performed through the cellular scheme or Wi-Fi communication in the above-described embodiment, the access may be made through another communication scheme. Although communication with the mobile communication terminal 51 in the vehicle cabin of the vehicle 100 is performed through Wi-Fi communication, communication may be performed based on other specifications such as Bluetooth®.

Figure 2:
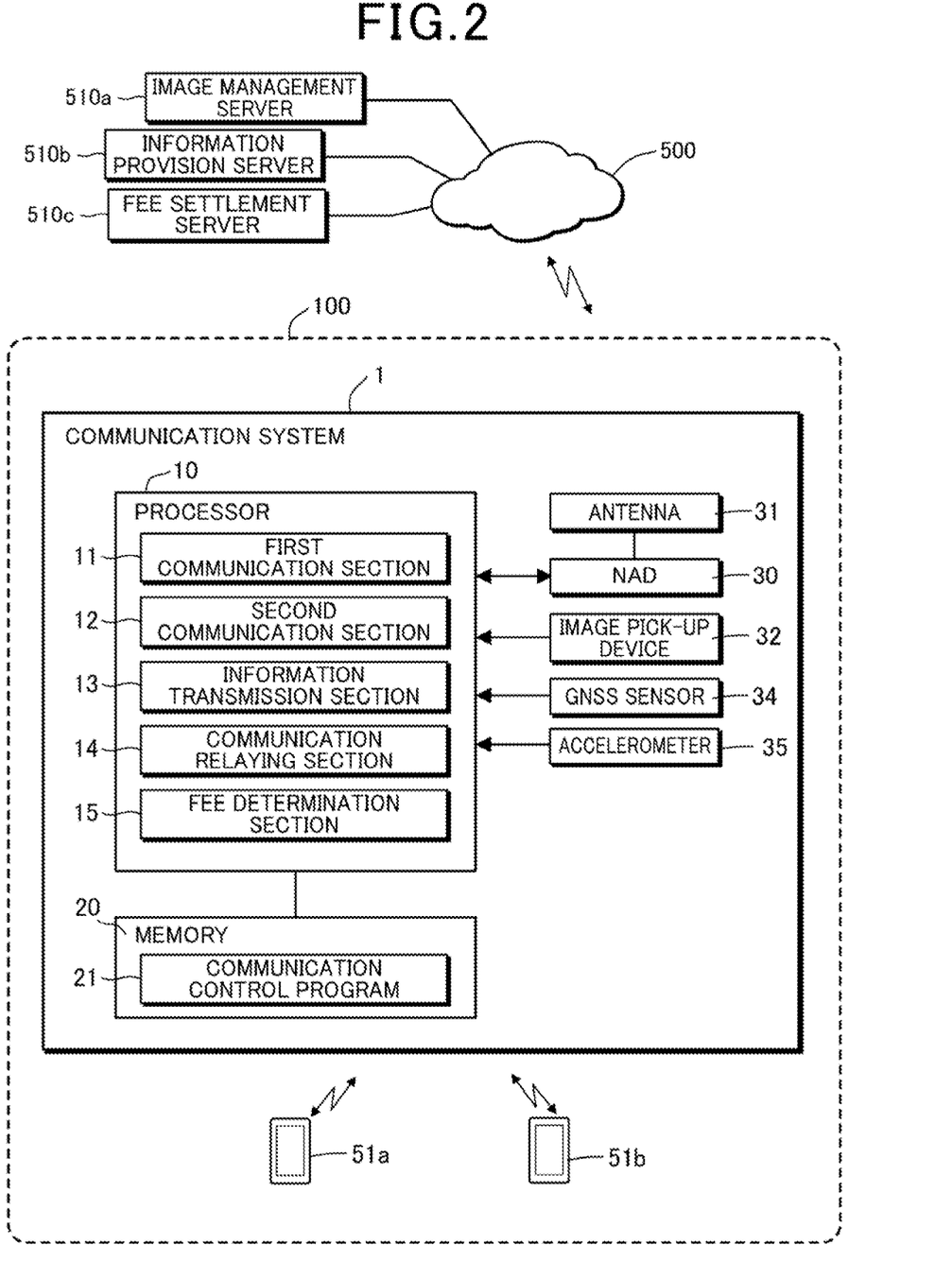
FIG. 2 shows a configuration of the communication system.

Note that FIG. 2 is a schematic diagram in which the configuration of the communication system 1 is shown by being segmented based on main processing contents in order to facilitate understanding of the invention of the present application, and the configuration of the communication system 1 may be segmented based on other categories. The processing by each constituent element may be performed by a single hardware unit, or may be performed by a plurality of hardware units. The processing by each constituent element according to the flowchart shown in FIG. 7 may be performed by using a single program, or may be performed by using a plurality of programs.

The fee determination section 15 included in the communication system 1 may be provided to another apparatus, for example, the image management server 510a, the fee settlement server 510c, or the like. In such a case, the communication system 1 according to the present disclosure can be configured by an information provision apparatus (for example, a driving recorder) including the constituent elements of the communication system 1 shown in FIG. 2 excluding the fee determination section 15, and another apparatus (for example, the image management server 510a or the fee settlement server 510c) including the fee determination section 15, as a whole. Moreover, in the case, the fee determination section 15 can be configured to acquire information on the first communication volume and the second communication volume from the first communication section 11 included in the information provision apparatus, for example, through an appropriate communication channel such as the communication network 500.

5. Configurations Supported by the Embodiment

The above-described embodiment supports configurations as described below.

(Configuration 1) A communication system including: an information transmission section that performs information transmission to an information collection apparatus via a communication network; a communication relaying section that performs communication relaying for connecting a mobile communication terminal to the communication network by relaying a communication to or from the mobile communication terminal; and a fee determination section that determines a communication fee for communication via the communication network, or a monetary amount of reward for the information transmission, wherein the fee determination section determines the communication fee or the monetary amount of reward, based on a first communication volume related to the information transmission, or based on a ratio of the first communication volume to a second communication volume related to the communication relaying.

According to the communication system in the configuration 1, the communication fee or the monetary amount of reward is determined based on the first communication volume related to the information transmission, or the ratio of the first communication volume to the second communication volume related to the communication relaying. Accordingly, with the communication system in the configuration 1, opportunities to gain monetary benefits as a result of performing information transmission are expanded, compared to a configuration in which the communication fee is simply determined based on a total sum of the first communication volume and the second communication volume, and the monetary amount of reward is simply determined based on the first communication volume. Consequently, provision of information by using the communication system 1 can be promoted.

(Configuration 2) The communication system according to the configuration 1, wherein the information transmission is transmission of image data captured by an image pick-up device, and the fee determination section determines the communication fee or the monetary amount of reward, based on the first communication volume as a communication volume related to the transmission of the image data, or based on the ratio of the first communication volume as the communication volume related to the transmission of the image data, to the second communication volume related to the communication relaying.

According to the communication system in the configuration 2, when the information transmission is performed for image data captured by the image pick-up device, which can be transmitted in a large amount, provision of information in a form of such image data can also be promoted.

(Configuration 3) The communication system according to the configuration 1 or 2, wherein the larger the first communication volume related to the information transmission is, or the larger the ratio of the first communication volume to the second communication volume related to the communication relaying is, the smaller communication fee or the larger monetary amount of reward the fee determination section determines.

According to the communication system in the configuration 3, the larger the value of the first communication volume related to the information transmission is, or the larger the ratio of the first communication volume to the second communication volume is, the greater the monetary benefits as a result of performing the information transmission are gained. Accordingly, provision of information using the communication system 1 can be further promoted.

(Configuration 4) The communication system according to any one of the configurations 1 to 3, further including a first communication section that, for the information transmission and the communication relaying, performs the communication via the communication network, through communication using a first communication scheme involving a charge, or through communication using a second communication scheme involving no charge, wherein the fee determination section determines the communication fee with respect to the communication using the first communication scheme, and determines the monetary amount of reward with respect to the first communication volume related to the information transmission using the second communication scheme.

According to the communication system in the configuration 4, since monetary benefits as a result of performing the information transmission can be gained in both cases where communications performed via the communication network involve a charge and involve no charge, provision of information using the communication system 1 can be further promoted.

(Configuration 5) The communication system according to any one of the configurations 1 to 4, wherein the communication system includes a camera including an image pick-up device, or a driving recorder including an image pick-up device.

According to the communication system in the configuration 5, the communication system of the present disclosure can be configured by extending functionality of a camera or a driving recorder.

(Configuration 6) The communication system according to the configuration 5, wherein the communication system is provided to a mobile object, and as the communication relaying, the communication relaying section connects the mobile communication terminal existing in the mobile object to the communication network by relaying a communication to or from the mobile communication terminal existing in the mobile object.

In the configuration 6, the communication system having any one of the configurations 1 to 4 includes a camera or a driving recorder provided to a mobile object, and relays a communication to or from a mobile communication terminal existing in the mobile object. Thus, according to the communication system in the configuration 6, provision of image information can be promoted by expanding opportunities to gain monetary benefits as a result of transmitting image information on various points acquired with movement of the mobile object.

REFERENCE SIGNS LIST

1 Communication system
10 Processor
11 First communication section
12 Second communication section
13 Information transmission section
14 Communication relaying section
15 Fee determination section
20 Memory
21 Communication control program
30 NAD
31 Antenna
32 Image pick-up device
34 GNSS sensor
35 Accelerometer
40 In-vehicle communication network
51, 51a, 51b Mobile communication terminal
60, 61, 62 Line
100 Vehicle (mobile object)
300 Base station
310 Router
500 Communication network
510 External communication apparatus
510a Image management server
510b Information provision server
510c Fee settlement server
U, U1, U2 User

What is claimed is:

1. A communication system comprising a processor that functions as:
an information transmission section that performs information transmission to an information collection apparatus via a communication network;
a communication relaying section that performs communication relaying for connecting a mobile communication terminal to the communication network by relaying a communication to or from the mobile communication terminal; and
a fee determination section that determines a communication fee for communication via the communication network, or a monetary amount of reward for the information transmission,
wherein
the fee determination section determines the communication fee or the monetary amount of reward, based on a first communication volume related to the information transmission, or based on a ratio of the first communication volume to a second communication volume related to the communication relaying,
the information transmission is transmission of image data captured by an image pick-up device, and
the fee determination section determines the communication fee or the monetary amount of reward, based on the first communication volume as a communication volume related to the transmission of the image data, or based on the ratio of the first communication volume as the communication volume related to the transmission of the image data, to the second communication volume related to the communication relaying.

2. The communication system according to claim 1, wherein the larger the first communication volume related to the information transmission is, or the larger the ratio of the first communication volume to the second communication volume related to the communication relaying is, the smaller communication fee or the larger monetary amount of reward the fee determination section determines.

3. The communication system according to claim 1, wherein
the processor further functions as a first communication section that, for the information transmission and the communication relaying, performs the communication via the communication network, through communication using a first communication scheme involving a charge, or through communication using a second communication scheme involving no charge, and
the fee determination section determines the communication fee with respect to the communication using the first communication scheme, and determines the monetary amount of reward with respect to the first communication volume related to the information transmission using the second communication scheme.

4. The communication system according to claim 1, wherein the communication system includes a camera including an image pick-up device, or a driving recorder including an image pick-up device.

5. The communication system according to claim 4, wherein
the communication system is provided to a mobile object, and
as the communication relaying, the communication relaying section connects the mobile communication terminal existing in the mobile object to the communication network by relaying a communication to or from the mobile communication terminal existing in the mobile object.

6. A communication system comprising a processor that functions as:
an information transmission section that performs information transmission to an information collection apparatus via a communication network;
a communication relaying section that performs communication relaying for connecting a mobile communication terminal to the communication network by relaying a communication to or from the mobile communication terminal; and
a fee determination section that determines a communication fee for communication via the communication network, or a monetary amount of reward for the information transmission, wherein
the fee determination section determines the communication fee or the monetary amount of reward, based on a first communication volume related to the information transmission, or based on a ratio of the first communication volume to a second communication volume related to the communication relaying, and
the larger the first communication volume related to the information transmission is, or the larger the ratio of the first communication volume to the second communication volume related to the communication relaying is, the smaller communication fee or the larger monetary amount of reward the fee determination section determines.

7. A communication system comprising a processor that functions as:
an information transmission section that performs information transmission to an information collection apparatus via a communication network;
a communication relaying section that performs communication relaying for connecting a mobile communication terminal to the communication network by relaying a communication to or from the mobile communication terminal; and
a fee determination section that determines a communication fee for communication via the communication network, or a monetary amount of reward for the information transmission,
wherein
the fee determination section determines the communication fee or the monetary amount of reward, based on a first communication volume related to the information transmission, or based on a ratio of the first communication volume to a second communication volume related to the communication relaying,
the processor functions as a first communication section that, for the information transmission and the communication relaying, performs the communication via the communication network, through communication using a first communication scheme involving a charge, or through communication using a second communication scheme involving no charge, and
the fee determination section determines the communication fee with respect to the communication using the first communication scheme, and determines the monetary amount of reward with respect to the first communication volume related to the information transmission using the second communication scheme.

8. A communication system comprising a processor that functions as:
an information transmission section that performs information transmission to an information collection apparatus via a communication network;
a communication relaying section that performs communication relaying for connecting a mobile communication terminal to the communication network by relaying a communication to or from the mobile communication terminal; and
a fee determination section that determines a communication fee for communication via the communication network, or a monetary amount of reward for the information transmission,
wherein
the fee determination section determines the communication fee or the monetary amount of reward, based on a first communication volume related to the information transmission, or based on a ratio of the first communication volume to a second communication volume related to the communication relaying,
the communication system includes a camera including an image pick-up device, or a driving recorder including an image pick-up device,
the communication system is provided to a mobile object, and
as the communication relaying, the communication relaying section connects the mobile communication terminal existing in the mobile object to the communication network by relaying a communication to or from the mobile communication terminal existing in the mobile object.

* * * * *